(12) United States Patent
Lu et al.

(10) Patent No.: US 7,944,389 B1
(45) Date of Patent: May 17, 2011

(54) EMITTER PROXIMITY IDENTIFICATION

(75) Inventors: Ning H. Lu, Parsippany, NJ (US); Peter D. Steensma, Green Pond, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 132 days.

(21) Appl. No.: 12/500,256

(22) Filed: Jul. 9, 2009

(51) Int. Cl.
*G01S 7/36* (2006.01)
(52) U.S. Cl. ............ 342/13; 342/42; 342/190; 342/191; 702/5; 702/127
(58) Field of Classification Search .................... 342/13, 342/42, 190, 191; 702/5, 127
See application file for complete search history.

(56) References Cited

U.S. PATENT DOCUMENTS
7,512,511 B1 * 3/2009 Schultz et al. ................ 702/127
* cited by examiner

*Primary Examiner* — Thomas H Tarcza
*Assistant Examiner* — Timothy A Brainard
(74) *Attorney, Agent, or Firm* — Edell, Shapiro & Finnan, LLC

(57) ABSTRACT

Systems and methods for monitoring and classifying RF emissions in the field include storing an electronic signature map (ESM) of a selected geographic area, where the electronic signature map includes previously detected emitter closeness measures (ECMs) in the selected geographic area. The ECMs are representative of detected sources of radio frequency energy. A RF energy emission is detected, a new ECM for that RF energy emission is created, and that the new ECM is compared with the ECMs in the ESM. That comparison may help to determine whether the RF energy emission should be considered a threat.

21 Claims, 10 Drawing Sheets

EMITTER PROXIMITY IDENTIFICATION

FIELD OF THE INVENTION

Embodiments of the present invention are related to systems and methods for quickly and effectively identifying, tracking, and geolocating radio frequency (RF) emitters that are located in the vicinity of a pathway of a moving platform.

BACKGROUND OF THE INVENTION

There is a general need for a moving platform to quickly and effectively identify, track, and geolocate radio frequency (RF) emitters that are located in the vicinity of its pathway. For example, improvised explosive devices (IEDs) are often detonated by remote control. Although the radio equipment associated with an IED itself might, generally, only operate in a receive mode, such radio equipment may nevertheless "leak" RF energy from embedded oscillators and the like. Such RF energy is often in the form of continuous wave (CW) energy.

FIG. 1 depicts a setting for describing RF emitter proximity identification from the perspective of a moving vehicle. As shown, a vehicle 100 is moving at a certain speed on a path/road 110. An RF emitter 120 is distance D away from the road. Variables r and θ are the range and bearing, respectively, from the vehicle 100 to the RF emitter 120, and the vehicle 100 is distance X away from the RF Emitter 120 on the path 110. Conventional approaches, such as Direction Finding (DF) and Geolocation (GEO) methods, are commonly used to identify, track, and geolocate various sources of radio transmissions. DF is the process of obtaining the direction of arrival (DoA) bearings of radio signal emitters. GEO is the process of determining, either directly or indirectly based on DF estimates and/or other measures, the locations of emitter(s) of interest. DF and GEO techniques, which have been researched over the last fifty years, are mostly understood. The theory and applications of DF/GEO are well described in the open literature and, as such, need not be further described herein.

As is well-known, DF and GEO procedures for identifying and/or locating RF emitters are usually based on energy/amplitude comparison, interferometric, time-of-arrival (TOA), time-difference-of-arrival (TDOA), and other antenna null-steering approaches. These approaches usually demand special antennas, close-tolerance amplitude/phase RF receiver components, enhanced receiver dynamic range, and expanded processing bandwidth. DF/GEO systems can calculate the direction of arrival (DOA) of a particular RF emitter using an array of spatially displaced antennas or rotating antenna. Nearly all DF algorithms require that signals from multiple antennas are received and routed to multiple signal processors synchronously. These signal processors are then used to compare the amplitude/energy, phase, and TOA/TDOA from the various signals to derive the DOA and then location of the RF emitter.

Unfortunately, a moving platform usually has very limited space and/or less than desirable conditions to deploy special antennas that require well-controlled directionality and/or high-precision antenna patterns. Furthermore, these conventional DF and GEO approaches require the use of close-tolerance receiver/processing components and extensive processing resources, which may not be cost-effective and/or feasible for a mobile platform. Therefore, prior devices based on conventional DF and GEO approaches can not effectively or economically identify, track, and geolocate RF emitters from a moving platform.

More specifically, some key challenges for conventional DF and GEO approaches include:

(1) The requirement for coherent sampling of multiple antenna inputs. Most DF/GEO algorithms require high-precision coherent or synchronous Analog-to-Digital (A/D) Conversion sampling of all input signals so that phase/timing information is maintained.

(2) The complex data flow and throughput required between A/D converters and processors, as well as between the processors themselves. For instance, in DF systems, blocks of samples are synchronously digitized, where the block size may be a run time programmable parameter. Samples are time-tagged and then sent to a processor where a fast Fourier transform (FFT) is applied (i.e., front end processing). FFT results from one processor are then distributed to all the other processors for comparison and further calculation (i.e., backend processing). Final results are then sent to the host processor from where they may be geolocated, displayed, and/or transmitted across the communications network for further non-real-time processing.

(3) The potential requirement for additional pre-processing of raw digitized data before undergoing an FFT by the processors and/or post-processing of the FFT results. The raw data have to be filtered, decimated, and run through threshold level monitors for subsequent signal processing.

In light of the foregoing, there is a need to find different or alternative approaches that can quickly and efficiently identify and geolocate RF emitters in the field.

SUMMARY OF THE INVENTION

Embodiments of the present invention enable a moving platform to quickly and effectively identify, track, and geolocate radio frequency (RF) emitters that are located in the vicinity of its pathway. An Emitter Proximity Identification (EPI) methodology is provided herein that uses Emitter Closeness Measures that can effectively and efficiently identify, track, and geolocate the RF emitters without, necessarily, using special antennas, close-tolerance receiver/processing components, and extensive processing resources.

More specifically, embodiments of the present invention provide a system/method that stores an Electronic Signature Map (ESM) of a selected geographic area. The ESM comprises previously-calculated Emitter Closeness Measures (ECMs) in the selected geographic area. The ECMs are representative of detected sources of radio frequency energy. The method and system further detect a radio frequency energy emission, create a new ECM for the radio frequency energy emission, compare the new ECM with the ECMs in the electronic signature map, determine whether the new ECM should be considered a threat, and geo-locate a position of an emitter represented by the new ECM.

In a preferred embodiment, the system is deployed on a vehicle to implement the methodology while moving. In one embodiment, the RF signal is detected with a single antenna only, whereas in other embodiments multiple antennas may be employed. Typically, the system seeks to detect continuous wave radio frequency (RF) energy, such as RF energy that may "leak" from an electronic device.

An ECM preferably includes a calculated rate of received signal strength (RSS) change (RRSSC) versus distance, and when RRSSC>2 dB/10 m the system may designate the emitter as a potential threat.

The ECM preferably also includes a calculated rate of bearing change (RBC) versus distance, and when RBC>3°/10 m the system may likewise designate the emitter as a potential threat.

The system and method may also provide for transmitting the new ECM from a first vehicle to a second vehicle, or from a vehicle to a base station.

These and other features of the several embodiments of the invention along with their attendant advantages will be more fully appreciated upon a reading of the following detailed description in conjunction with the associated drawings.

DETAILED DESCRIPTION

Embodiments of the present invention depend on what is referred to herein as Emitter Closeness Measures (ECMs), which include Rate of Received Signal Strength (RSS) Changes (RRSSCs) and Rate of Bearing Changes (RBCs) of a detected source of RF energy in the context of a moving platform. Since these ECMs are based on relative measures or metrics, they are less sensitive to implementation errors of processing components and antennas.

Figure 1:
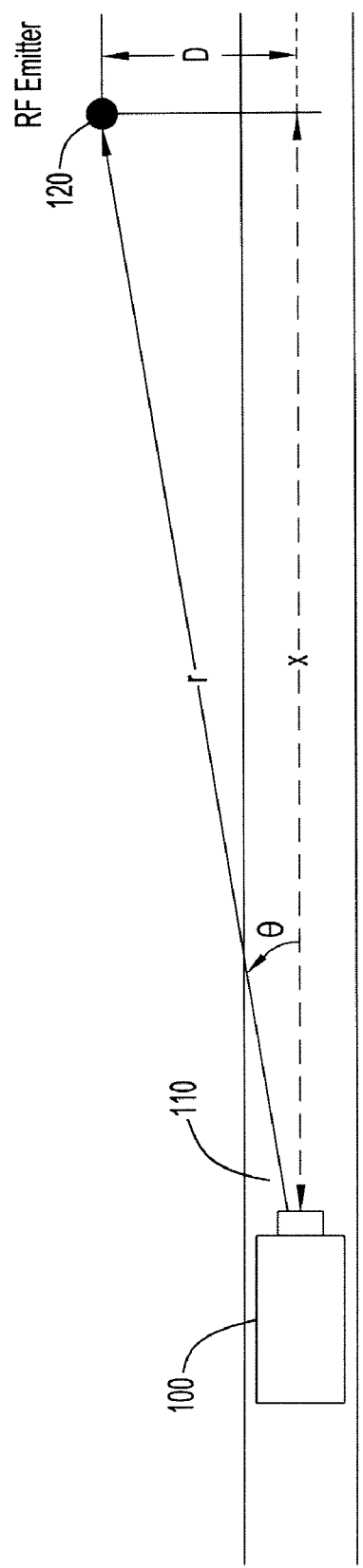
FIG. 1 depicts a setting for describing RF emitter proximity identification from the perspective of a moving vehicle.
Figure 2:
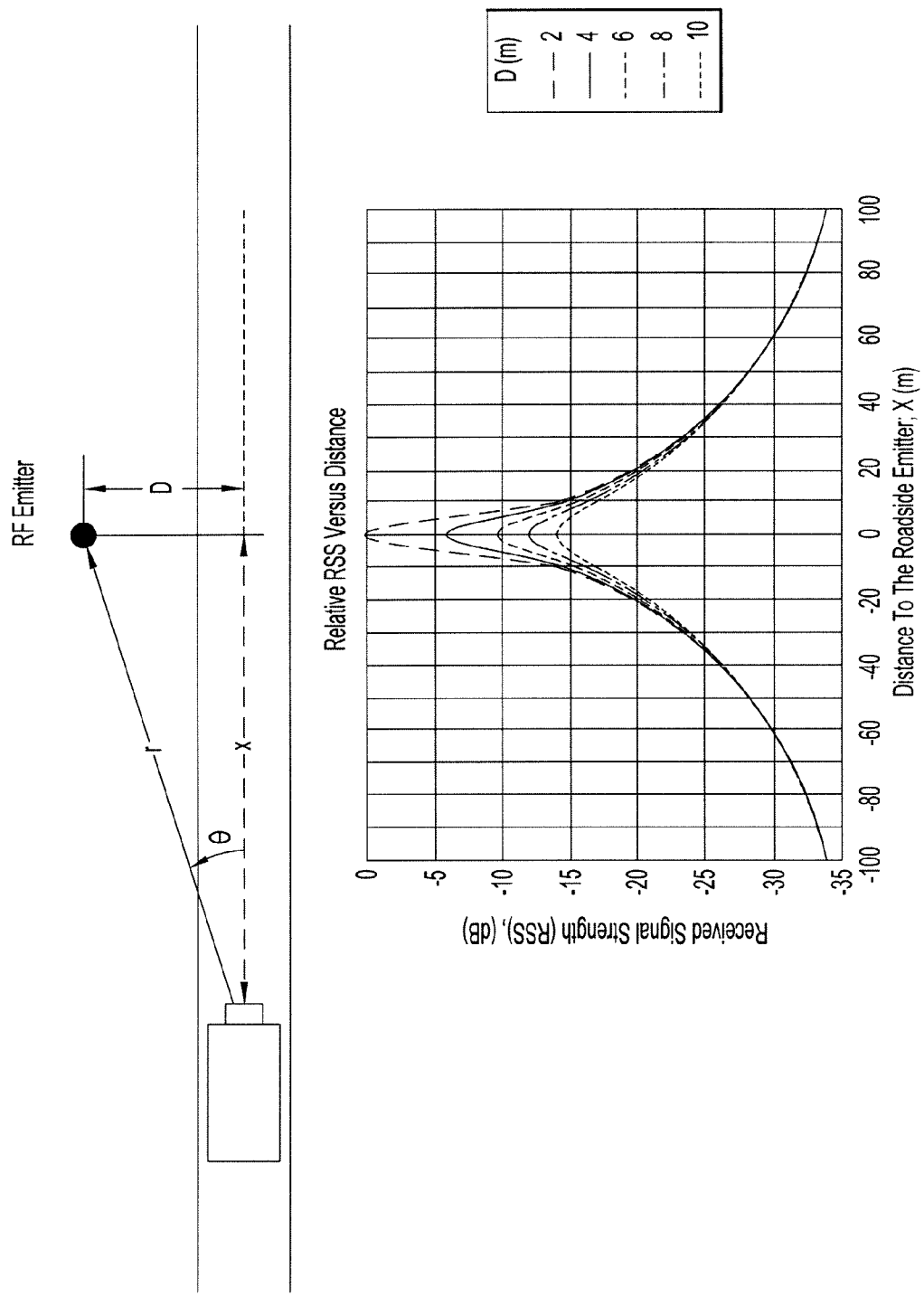
FIGS. 2 and 3 are, respectively, plots of Received Signal Strength (RSS) and Bearing θ parameterized with distance D meters.
Figure 3:
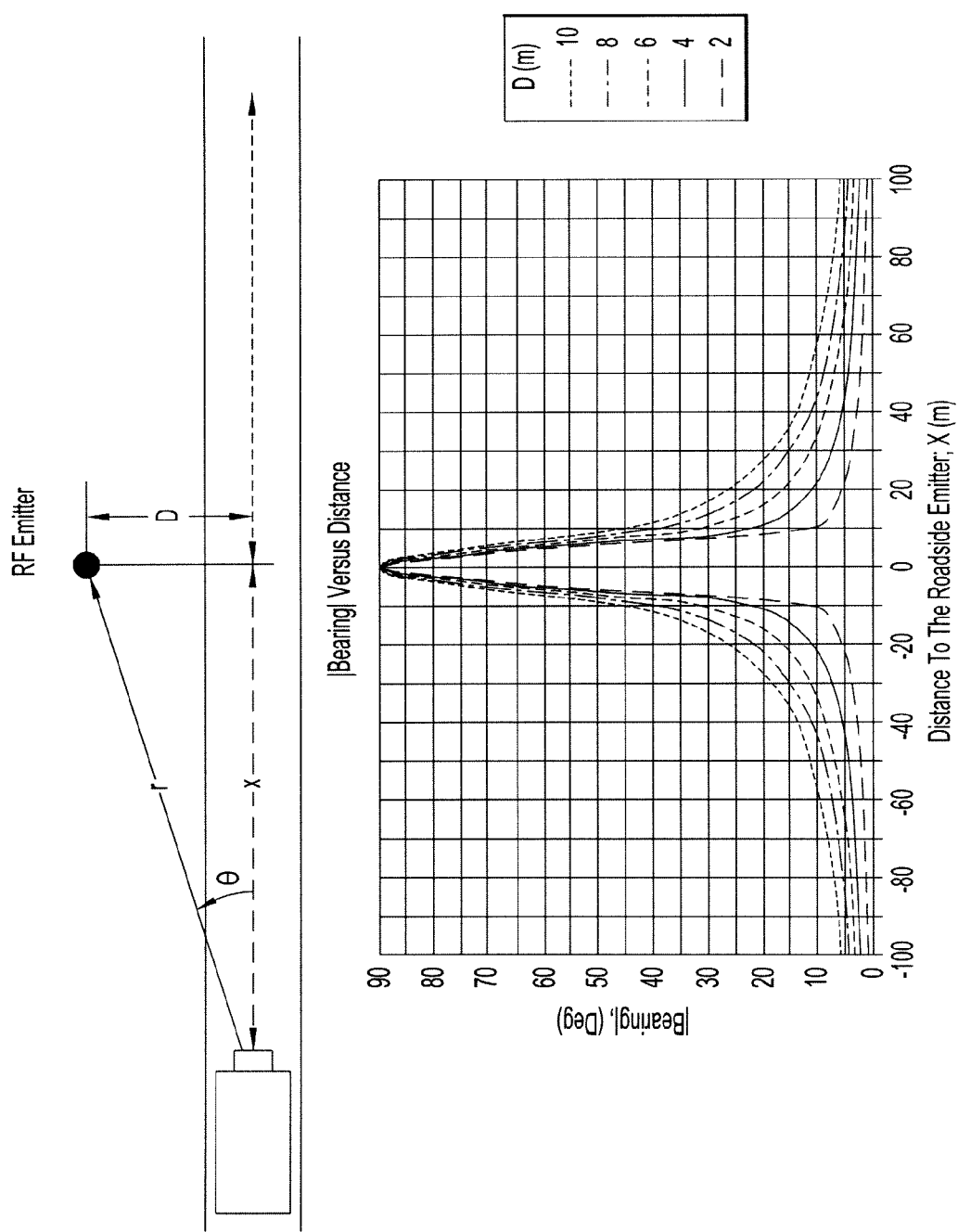

More specifically, characteristics of Received Signal Strength (RSS) and Bearing θ, measured from vehicle 100, are illustrated and parameterized with distance D in FIGS. 2 and 3, respectively. As can be seen from the illustrated plots in the figures, the closer the emitter 120 is to the path 110, the greater the RSS. Also, as the vehicle 100 approaches the emitter 120, the bearing to the emitter 120 approaches and ultimately reaches 90°.

Figure 4A:
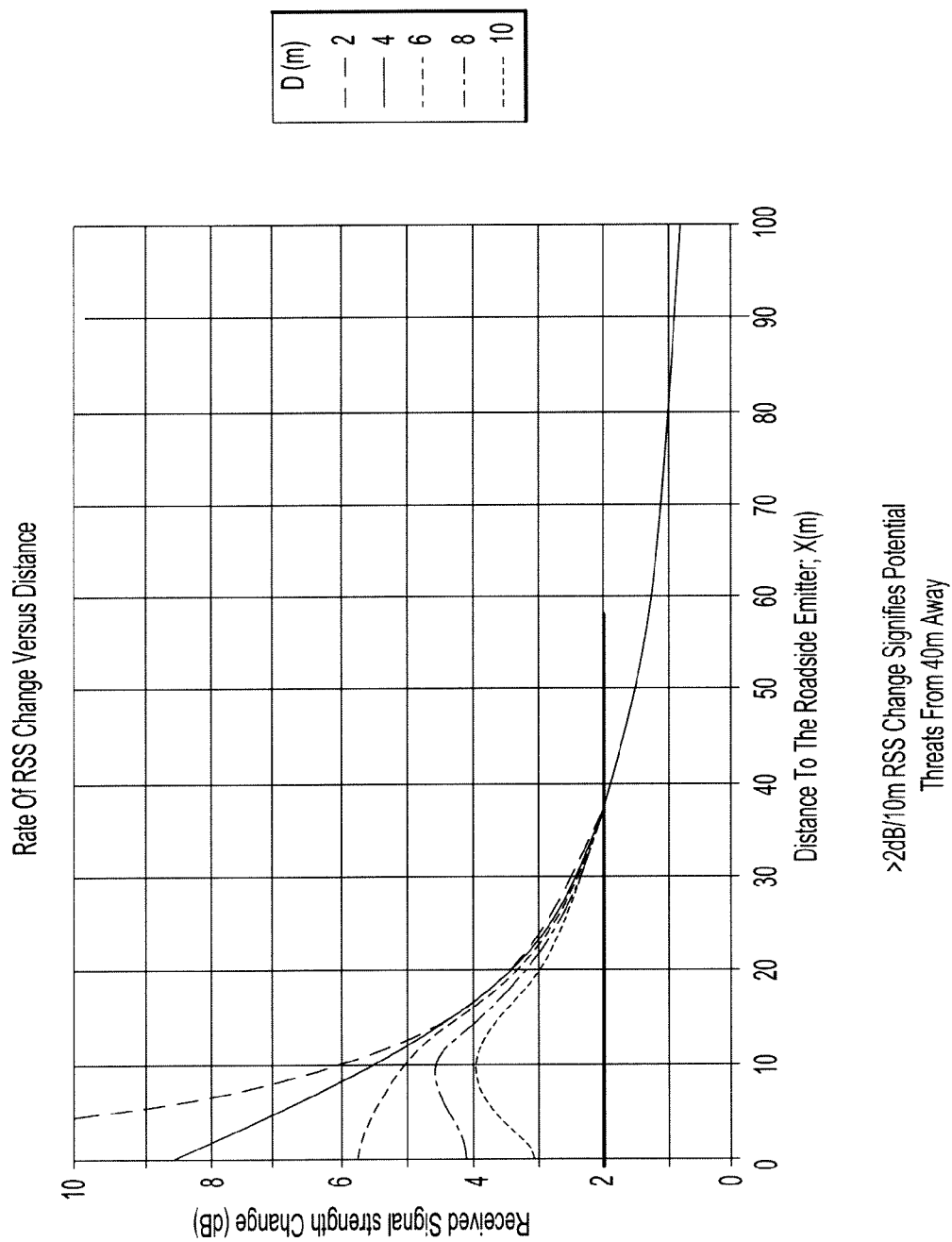
FIGS. 4A and 4B are, respectively, plots of characteristics of Rate of RSS Change (RRSSC) and Rate of Bearing Change (RBC) in accordance with an embodiment of the invention.
Figure 4B:
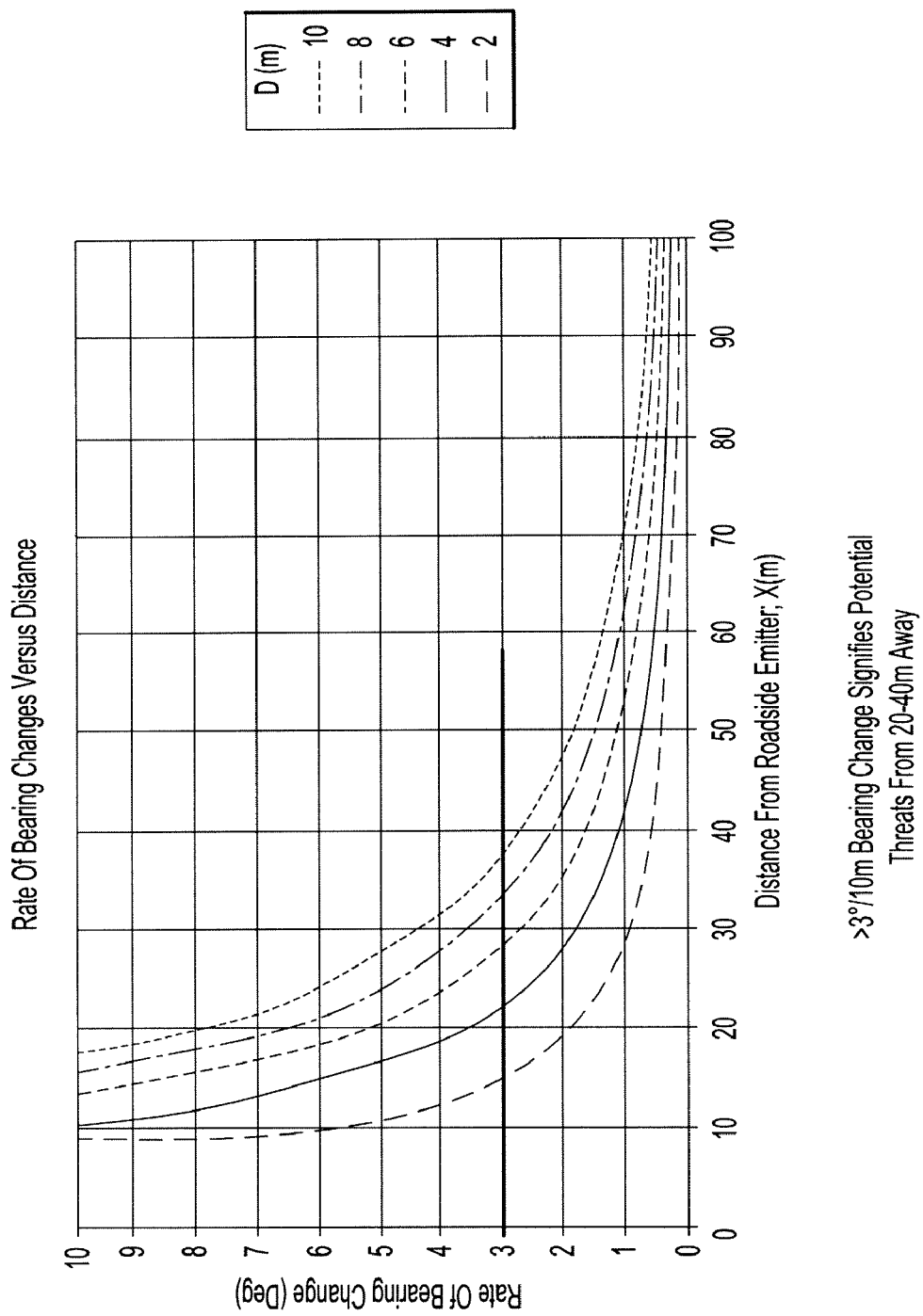

As will be appreciated by those skilled in the art, the RSS and the bearing change rapidly when the vehicle 100 is in the vicinity of the RF emitter 120. The characteristics of RRSSC and RBC are depicted in FIGS. 4A and 4B. Analyses indicate that the Rate of RSS Changes (RRSSCs) and the Rate of Bearing Changes (RBCs) are very robust measures for a moving platform to identify and track RF emitters that are located in the vicinity of its pathway. As can be seen from the plot in FIG. 4A, a RRSSC of >2 dB/10 m signifies a potential threat from 40 meters away. In the plot of FIG. 4B, a RBC of >3°/10 m signifies a potential threat from 20-40 meters ways.

In accordance with an embodiment of the invention, RF emitters in the field are monitored as the vehicle 100 moves along a road, for example, and characteristics of the emitters, including RRSSC and RBC, are captured. Those characteristics, in the form of ECMs, are then compared to a previously-stored Electronic Signature Map (ESM) that comprises previously-generated ECMs, and it is determined whether a given RF emitter poses a threat to the vehicle 100 or personnel in the vicinity of the vehicle 100.

In one possible embodiment, and to mitigate multipath effects, the ECMs may be compared and optimized using the measurements obtained from two spatially separate antennas with a spacing of greater than a correlation distance of multipath signals. While the use of multiple antennas may be helpful, a single antenna can also be used in embodiments of the present invention.

Again, as indicated in FIGS. 4A and 4B, basic RF emitter identification rules in accordance with an embodiment of the invention may be as follows:

1. An RRSSC>2 dB/10 m indicates that a potential RF emitter is located about <40 m away, or
2. An RBC>3°/10 m indicates that a potential RF emitter is located about <20-40 m away.

In other words, if the rate of RSS change is more than 2 dB over a 10 meter span, then the emitter can be considered to be about less than 40 meters away. As noted before, the RRSSC measure is a relative measure in that it is based on a current RSS measure with respect to, e.g., a prior RSS measure taken, in this case, 10 meters behind the current RSS measure. In operation, a system operating in accordance with an embodiment of the present invention samples the RSS every 10 meters and stores that resulting measure. As pairs of RSS measures (10 meters apart) are detected and stored, it is then possible to calculate a rate of change of this measure from one 10 meter point to the next. of course, rate of change can be based on an average of prior readings, or any other suitable approach.

The same analysis is performed with respect to bearing. As the vehicle 100 moves along the pathway 110, a bearing to a potential RF emitter is captured. Once multiple measures of bearing are stored, it is then possible to calculate a rate of change of this measure from one 10 meter point to the next.

When the measures of RRSSC and RBC fall within the parameters of the "emitter identification rules" set forth above, then the RF emitter being monitored can be considered to be "close" or "proximate" to the moving vehicle.

ECMs may be stored on a per frequency basis such that an ECM might have the following form:

| |
|---|
| FREQ |
| ECM n |
| RSS |
| Bearing |
| LOCATION of VEHICLE |
| (e.g., GPS coordinates) |
| RRSSC (based on ECM n-1) |
| RBC (based on ECM n-1) |

Figure 5:
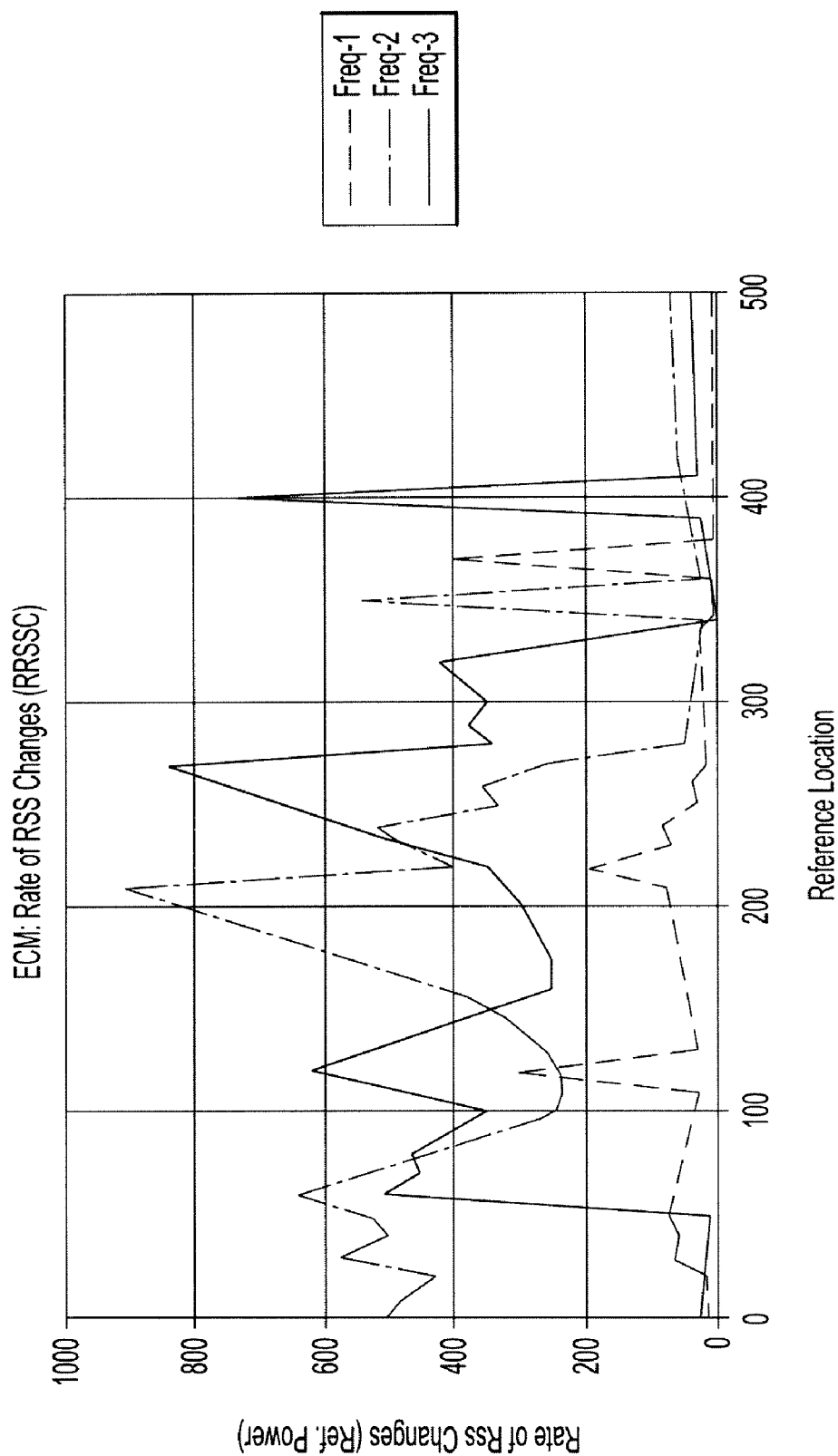
FIG. 5 shows a sample of Emitter Closeness Measures (ECMs) in terms of RRSSC in accordance with an embodiment of the present invention.

Notably, the ECMs are very efficient in data logging. FIG. 5 shows a sample of ECMs in terms of RRSSC for three frequency tracks measured from 0-500 reference locations.

The ECM in terms of RBC can be similarly obtained and plotted. It should be noted that recording the ECMs requires about 10,000 times less memory/storage capacity as compared to direct recording of the power spectral density, assuming uniformly distributed emitters over a 1 km by 1 km area. This assumes that ECMs effectively capture the relative measures in one 10 m strip along the path and measured at every 10 m of moving distance.

The following provides a more detailed description of the EPI methodology that allows a moving platform to identify, track, and geolocate RF emitters that are located in the vicinity of its pathway. "Identify," "track," and "geolocate," in the context of embodiments of the present invention, can be defined, generally, as follows:

Identify: Detect potential threats, classify threats types, and generate alerts

Track: Minimize ambiguities and multipath effects and provide 1st order r and θ

Figure 6:
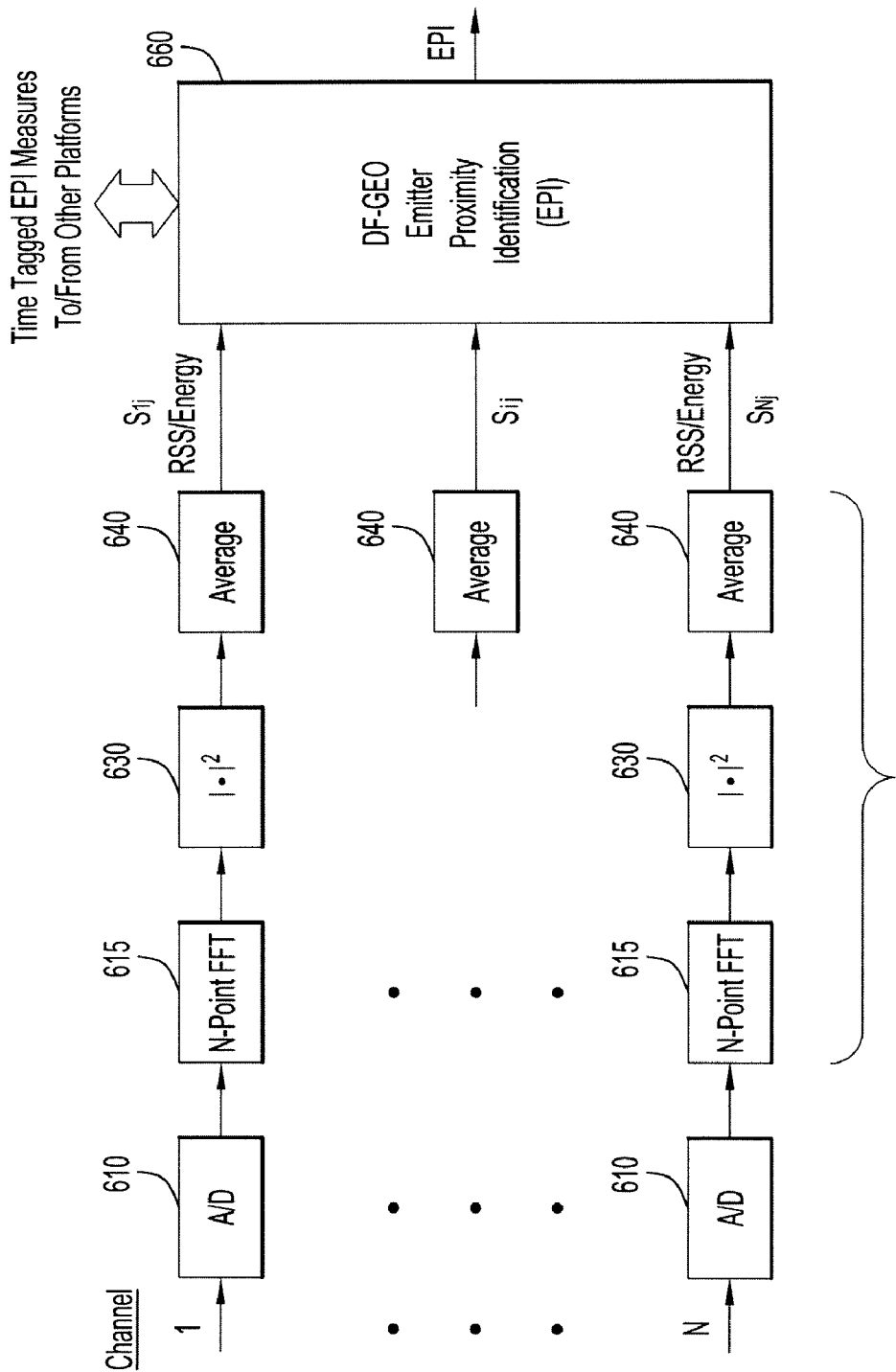
FIG. 6 depicts a signal processing architecture for enabling aspects of an Emitter Proximity Identification (EPI) methodology in accordance with an embodiment of the present invention.

Geolocate: Use available Situational Awareness (S/A) information and other DOA measures to determine the location of threats FIG. 6 depicts a signal processing architecture for enabling aspects of the EPI methodology. At a high level, an RF emitter signal is first acquired and detected, frequency may be estimated, and the direction is then estimated.

More specifically, filtered RF/IF signals from multiple receivers (channels 1 through N) may be synchronously digitized (if N>1) (using A/D converters 610), windowed and digital filtered, and processed via multiple FFT blocks 615. Synchronous digitization may use A/Ds featuring both an external clock input and a software-enabled external Synchronization bus (sync I/O), which allows one master A/D converter to synchronously initiate sampling on the other, slave, A/D converters. Preferably, all of the A/Ds 610 share the same clock source at the desired sampling frequency. Digitized samples are sent through, e.g., $|\cdot|^2$ blocks 630, and then into signal energy average blocks 640, to derive the average RSS/energy, denoted by $S_{ij}$, where i indicates the ith channel and j denotes the jth platform.

Results of these various processors, blocks, and stages including RSS/Energy, phase, and amplitude based measures are passed to direction finding/geolocating (DF/GEO) block 660, where the EPI methodology may be encoded.

Signal processing software employed in DF/GEO block 660 is preferably configured to adapt high-speed unambiguous solutions within compact, affordable processing resources. Algorithms (known to those skilled in the art) specific to solving DF/GEO estimation from multiple technical approaches may be executed for low latency, confidence, flexibility, and reliability. Automatic calibration and built-in test (BIT) schemes may also be provided to account for antenna pattern variations, component variations, and environmental effects, while seeking the best compromise between system accuracy and cost efficiency.

As further shown, DF/GEO block 660 is also preferably configured to exchange EPI measures with other platforms. For example, assume two vehicles travel along the same road, but spaced in time by, e.g., one hour. The first vehicle can monitor the RF emissions in the vicinity of the road and provide dynamic updates to the second vehicle. In this way, the second vehicle may have a better opportunity to decide whether the threat level due to detected RF emissions justifies continuing down the road.

Figure 7:
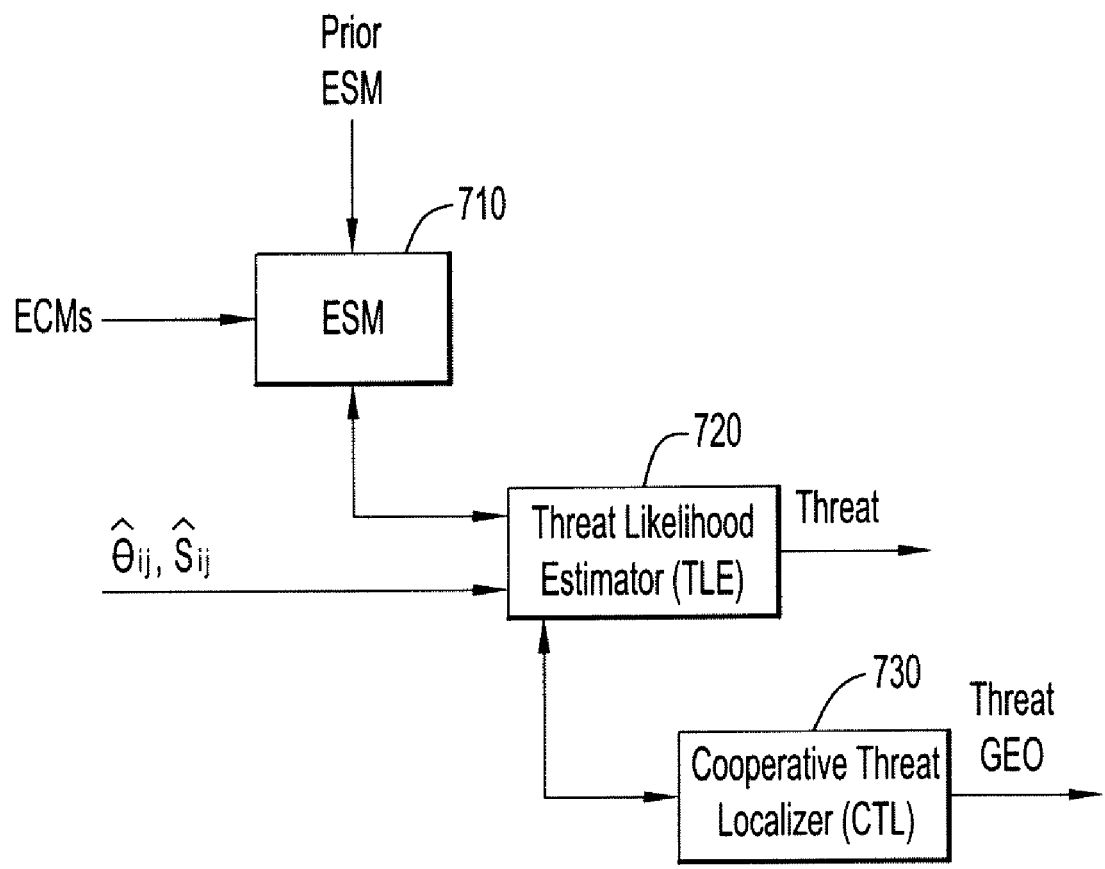
FIG. 7 shows a functional block diagram of components for implementing the EPI methodology in accordance with an embodiment of the present invention.

In this regard, FIG. 7 depicts a functional block diagram of components for enabling the EPI methodology. As noted, this methodology may be incorporated into DF/GEO block 660. Alternatively, the functionality may be implemented in a separate processing block. As shown in FIG. 7, the EPI methodology leverages several functions (which may be implemented together or separately). As shown, there is preferably provided an Emitter Signature Map (ESM) block 710, a Threat Likelihood Estimator (TLE) 720, and a Cooperative Threat Locator (CTL) 730.

In an embodiment, the ESM block 710:

Monitors RF emissions, calculates the Emitter Closeness Measures and stores and updates the ECMs to the Emitter Signature Map.

The ECMs preferably comprise the RRSSC and RBC per frequency measured, for example, every 10 m or 1 second whichever comes first.

The latest Emitter Signature Map (ESM) may be loaded as the RF environmental baseline prior to each mission.

Further, the ESM may be overlaid onto a GPS navigation map display, thus graphically showing the locations of both known and unknown sources of RF energy.

Figure 8:
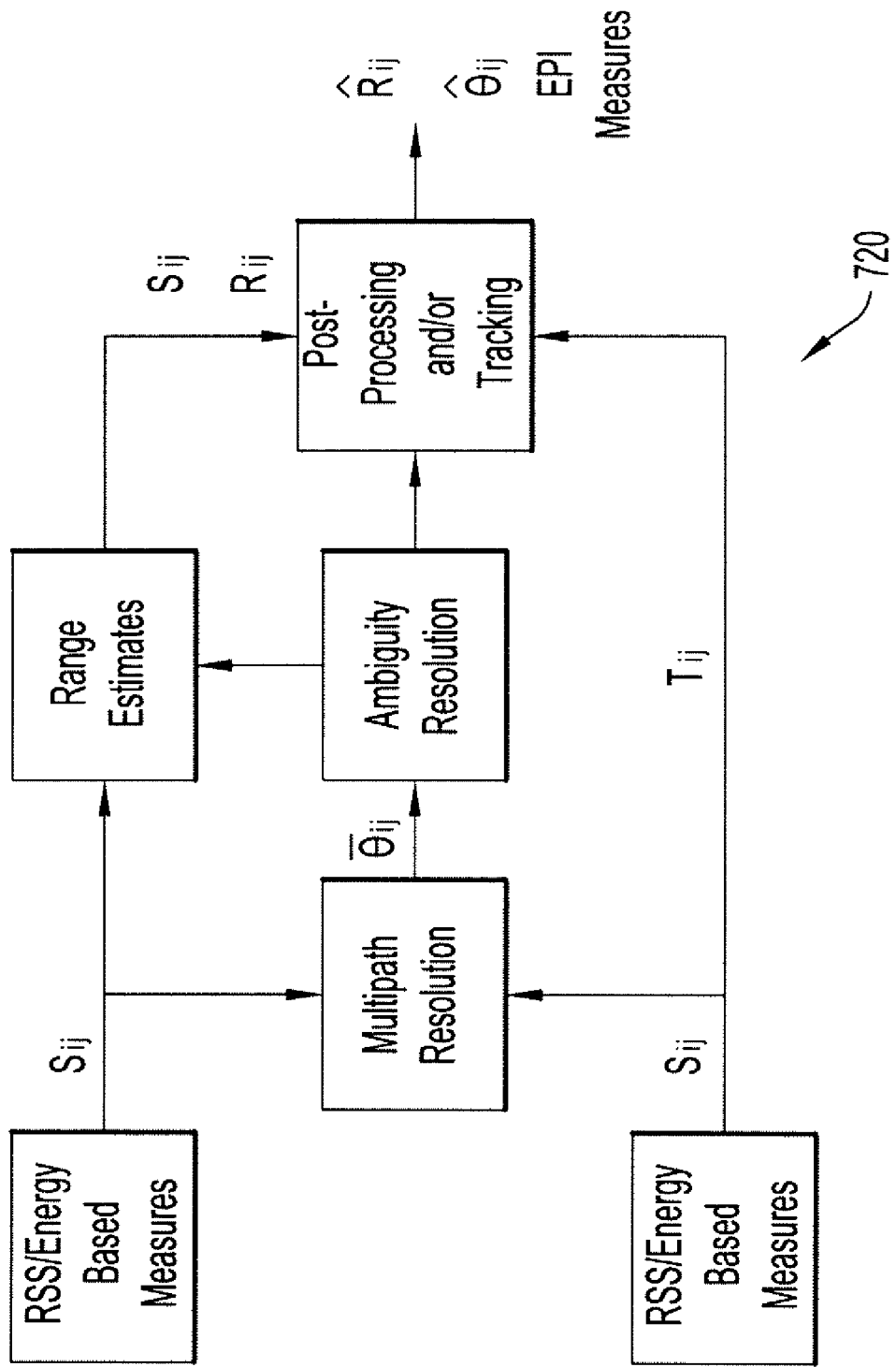
FIG. 8 depicts a process flow of a Threat Likelihood Estimator (TLE) in accordance with an embodiment of the present invention.

The Threat Likelihood Estimator (TLE) 720 uses measures derived from separate antennas, if available, to eliminate spatial ambiguities and mitigate multi-path effects. A more detailed view of a process flow for TLE 720 is depicted in FIG. 8. As shown, the RSS/energy based measures are passed to a range estimate block and multipath resolution block. Results of the multipath resolution block are passed to an ambiguity resolution block. Results of that block are ultimately provided to a post processing and/or tracking block from which EPI measures (range and bearing) are output.

TLE 720 preferably also assesses the currently measured ECMs and identifies the potential threats by comparing to the prior ECMs stored in the ESM.

The Cooperative Threat Localizer (CTL) block 730 further fuses the information being made available. More particularly, CTL block 730 estimates and tracks the range/bearing (R, θ) of threats.

CTL 730 preferably further opportunistically and cooperatively tracks and geolocates the threats via the available measures obtained from its own platform and/or from other platforms.

Finally, CTL 730 may share or transmit information to the Community of Interest (COI) and/or upload it to a command center or base station.

Those skilled in the art will appreciate that the components shown in FIGS. 6-8 may be implemented in software, hardware or a combination of software and hardware. Typically the described functionality may be encoded using logic (software or hardware) on a computer system including appropriate processor(s), memory, power supplies and input/output capabilities, etc.

Operation of the EPI Methodology

The RF emitter signatures are efficiently stored in the ESM in the form of ECMs. Prior to each mission, the ESM is loaded with the latest information regarding the ECMs obtained during the previous missions. The current ECMs are analyzed in the TLE 730 to eliminate ambiguities, mitigate multi-path effects, and identify the potential threats by comparing to the stored ECMs. The ESM may be updated during a mission and shared among other platforms. Opportunistically and cooperatively using the information obtained from other measures and/or from other platforms, the CTL 730 refines the assessment of threats, tracks the threats, and geolocates the threats.

Figure 9:
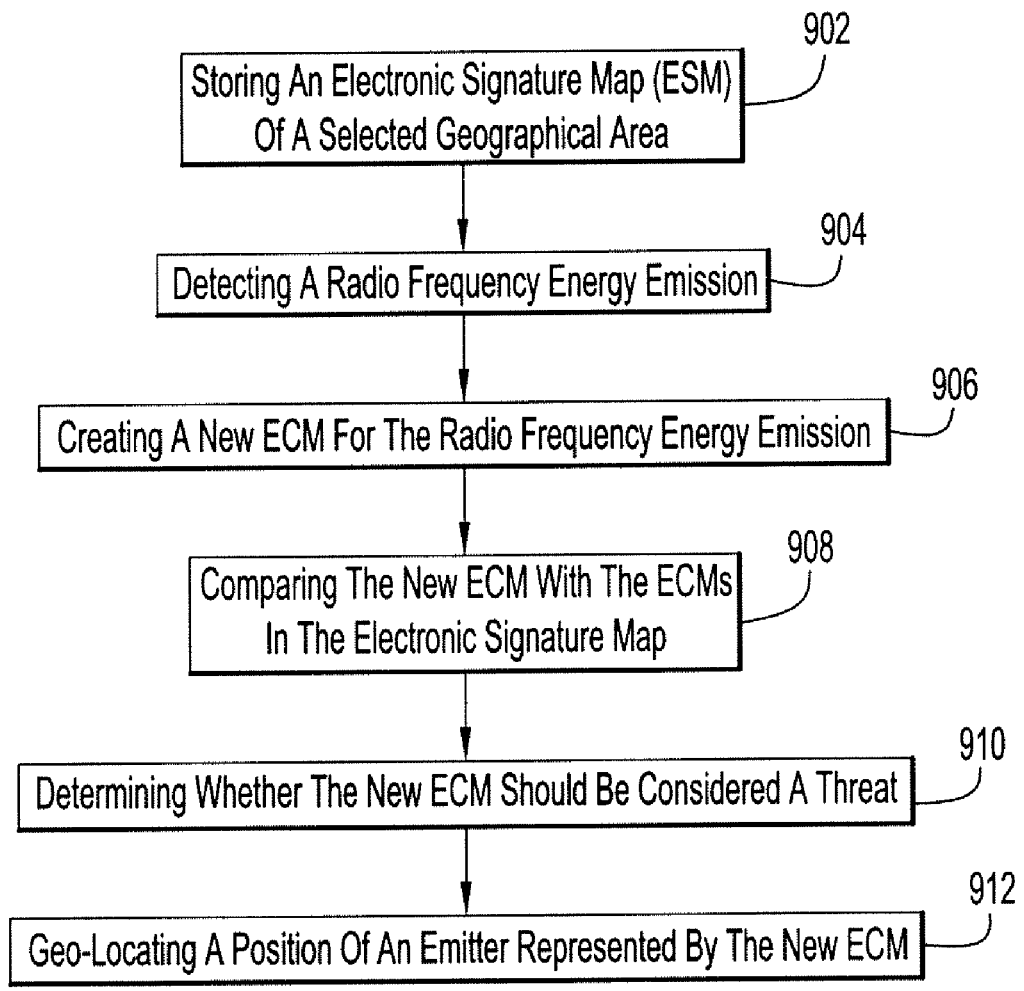
FIG. 9 shows a flowchart that depicts a series of steps for performing the EPI methodology in accordance with an embodiment of the present invention.

FIG. 9 shows a flowchart that depicts a series of steps for performing the EPI methodology. As shown, at step 902, the electronic signature map (ESM) of a selected geographic area is stored. As explained above, the ESM comprises previously calculated ECMs in the selected geographic area. Each ECM represents one or more records, data base entries, etc., that characterizes a source of emitted RF energy by RRSSC and RBC.

Then, at step 904, RF energy is detected. Typically, a vehicle 100 having one or more antennas along with equipment that is configured to operate in accordance with the functionality described herein, drives along a selected route, preferably a route that has already been travelled and analyzed to generate an ESM. Once RF energy is detected, at step 906, new ECMs are created for the RF energy emission. Again, those ECMs preferably include RRSSC and RBC data for that RF energy emission.

At step 908, a new ECM is compared with the ECMs in the electronic signature map (ESM). At step 910 it is determined whether the new ECM should be considered a threat. These latter two steps may be performed by the threat likelihood estimator (TLE) 720, as shown in, e.g., FIGS. 7 and 8. At least part of the comparison includes whether the new ECM matches any ECMs in that same geographic region, i.e., has the detected RF energy source been detected previously?

Finally, at step 912, a position of an emitter represented by the new ECM is geolocated, and as desired, added to a database, a geographic map, as well as to the continually evolving ESM for the path or route taken by the vehicle 100.

As noted, the RF energy that is being detected is typically RF energy that is always present, intentionally or not. For example, radios and cell phones, among other devices, even when not in a transmitting mode, nevertheless have an electronic emission signature. Often times, this signature is the result of on-board oscillation circuits that may be used for demodulating purposes, or for operation of DSP circuitry/functionality. Thus, typical RF emissions being monitored in the context of the present invention have relatively low amplitudes and may simply be undetectable from relatively large distances. As a result, the methodology described herein is focused primarily on measures that provide indications of emitters that are close or proximate a monitoring platform.

In summary, the EPI methodology described herein, which relies on the use of ECMs, has the following advantages over prior state-of-the-art DF/GEO approaches:

Embodiments of the present invention use relative measures to achieve robust performance. As a consequence, embodiments of the present invention do not necessarily need:
  Special antennas that require well-controlled directionality and/or high-precision antenna patterns
  Close-tolerance amplitude/phase RF receiver components,
  Enhanced receiver dynamic range, or
  Expanded processing bandwidth.

The ECMs, as used in connection with embodiments of the present invention, can be efficiently stored as the emitter signatures. Memory reduction >10,000 times over direct recording of the power spectral density can be achieved, assuming uniformly distributed emitters over a 1 km by 1 km area.

Potential threats may be identified by comparing the differences between the current and the stored ECMs.

Finally, embodiments of the present invention use relative measures, from which the EPI methodology can more effectively eliminate ambiguities and mitigate multi-path effects.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method, comprising:
  storing an electronic signature map (ESM) of a selected geographic area, the electronic signature map comprising previously calculated emitter closeness measures (ECMs) in the selected geographic area, wherein the ECMs are representative of detected sources of radio frequency energy;
  detecting a radio frequency energy emission;
  creating a new ECM for the radio frequency energy emission based on relative measures of the radio frequency emission;
  comparing the new ECM with the ECMs in the electronic signature map;
  determining whether the new ECM should be considered a threat; and
  geo-locating a position of an emitter represented by the new ECM.

2. The method of claim 1, wherein the geographic area comprises a road via which vehicles traverse.

3. The method of claim 1, wherein detecting comprises detecting with a single antenna only.

4. The method of claim 1, wherein detecting comprises detecting with multiple antennas.

5. The method of claim 1, wherein detecting comprises detecting continuous wave radio frequency energy.

6. The method of claim 1, wherein creating a new ECM comprises calculating a rate of received signal strength (RSS) change (RRSSC) versus distance.

7. The method of claim 6, further comprising designating the radio frequency emission as a potential radio frequency emitter threat when RRSSC>2 dB/10 m.

8. The method of claim 1, wherein creating a new ECM comprises calculating a rate of bearing change (RBC) versus distance.

9. The method of claim 8, further comprising designating the radio frequency emission as a potential radio frequency emitter threat when RBC>3°/10 m.

10. The method of claim 1, further comprising presenting the position of the emitter on a map.

11. The method of claim 1, further comprising transmitting the new ECM from a first vehicle to a second vehicle.

12. The method of claim 1, further comprising transmitting the new ECM from a vehicle to a base station.

13. A method for monitoring sources of radio frequency (RF) energy in the field, comprising:
  storing an emitter signature map (ESM) comprising a plurality of emitter closeness measures (ECMs), wherein each ECM represents a relative measure of a signal strength and location from which a source of RF energy is detected;
  detecting a RF emission in the field;
  comparing metrics of the RF emission to the plurality of ECMs;
  identifying whether the RF emission should be considered a potential threat; and
  geolocating a source of the RF emission.

14. The method of claim 13, further comprising eliminating ambiguities with respect to the RF emission using the ESM.

15. The method of claim 13, further comprising mitigating multi-path effects with respect to the RF emission.

16. The method of claim 13, further comprising sharing information with respect to the RF emission with another platform.

17. The method of claim 13, further comprising calculating a rate of received signal strength (RSS) change (RRSSC) versus distance.

18. The method of claim 17, further comprising designating the RF emission as a potential radio frequency emitter threat when RRSSC>2 dB/10 m.

19. The method of claim 13, further comprising calculating a rate of bearing change (RBC) versus distance.

20. The method of claim 19, further comprising designating the RF emission as a potential radio frequency emitter threat when RBC>3°/10 m.

21. A system for monitoring radio frequency emitters in the field, comprising:
- an analog to digital (A/D) converter configured to receive an analog radio frequency or intermediate frequency signal and output a digital signal;
- a digital signal processing module configured to receive the digital signal and output metrics indicative of the RF signal;
- an electronic signature map (ESM) database, the ESM database configured to store previously-calculated emitter closeness measures (ECMs) in a selected geographic area, wherein the ECMs are representative of detected sources of radio frequency energy; and
- an emitter proximity identification module configured to
  - create a new ECM for the radio frequency signal;
  - compare the new ECM with the ECMs in the ESM database;
  - determine whether the new ECM should be considered a threat; and
  - geo-locate a position of an emitter represented by the new ECM.

* * * * *